United States Patent [19]

Wolrich et al.

[11] Patent Number: 4,623,981

[45] Date of Patent: Nov. 18, 1986

[54] ALU WITH CARRY LENGTH DETECTION

[75] Inventors: Gilbert Wolrich, Framingham; Edward J. McLellan, Acton; Robert Yodlowski, Hudson; Daniel Dobberpuhl, Shrewsbury, all of Mass.

[73] Assignee: Digital Equipment Corporation, Maynard, Mass.

[21] Appl. No.: 534,018

[22] Filed: Sep. 20, 1983

[51] Int. Cl.$^4$ ............................................. G05F 7/50
[52] U.S. Cl. .................................... 364/736; 364/787
[58] Field of Search ........ 364/736, 787, 900 MS File, 364/200 MS File; 328/58; 307/265, 267

[56] References Cited

U.S. PATENT DOCUMENTS

| | | | |
|---|---|---|---|
| 3,548,177 | 12/1970 | Hartlipp et al. | 364/900 |
| 3,947,671 | 3/1976 | Geng et al. | 364/786 |
| 3,983,538 | 9/1976 | Jones | 364/716 |
| 4,099,248 | 7/1978 | Borgerson et al. | 364/787 |
| 4,105,978 | 8/1978 | Goss et al. | 307/267 |
| 4,504,924 | 3/1985 | Cook et al. | 364/787 |

Primary Examiner—James D. Thomas
Assistant Examiner—Dale M. Shaw
Attorney, Agent, or Firm—Cesari and McKenna

[57] ABSTRACT

An ALU, performing selected operations on input operands in a predetermined clock cycle, uses means for detecting a carry propagation path greater than a predetermined number of consecutive bit positions to cause a stretching of the clock cycle. Since such a long carry propagation path is detected for only a very small percentage of all operations, the cycle is normally shorter than otherwise possible, AND, thus, the performance of a system using such an improved ALU is increased.

4 Claims, 6 Drawing Figures

ALU WITH CARRY LENGTH DETECTION

BACKGROUND OF THE INVENTION

This invention deals with the Arithmetic and Logic Unit (ALU) section of computing systems, and more particularly it deals with synchronous ALUs having a look-ahead carry chain.

Presently, one type of computing systems with ALUs use a look-ahead carry chain to improve the performance of the system, i.e. increase the speed of the computations. Very briefly, a conventional look-ahead carry chain is made up of a plurality of serial slices, with each slice having a predetermined number of input bit pairs together forming a group. Within each slice a carry bit is propagated serially from the lower input pairs to the higher input pairs. However, the carry input from one slice to the next successive slice is not taken from this slow propagating carry bit, but is instead generated from the group carry-propagate ($P_g$) and group carry-generate ($G_G$) signals produced in the current and all of the prior slices. That is, the carry chain is "looking ahead" for the carry information between slices by generating a series of group carry signals, thus avoiding the propagation delay of the carry bit between all of the input bit pairs. A serious problem with this type of system is that the performance of the system is still always limited by the worst case propagation delay of the look-ahead carry chain i.e. the propagation of the group carry information. For a synchronous system this means that the smallest cycle time obtainable must be at least as long as the propagation delay for the combination of input bits that produces the longest group carry ripple.

In some present day systems, the required cycle time is shortened by using a carry-save scheme. In this case, the system obtains all the intermediate (that is, bit or group) sums and carrys is one cycle, and combines them in a subsequent cycle to obtain the final answer. The problem of this approach is that the system must now pay an increased price in the hardware complexity required to implement a carry-save ALU.

SUMMARY OF THE INVENTION

It is an object of this invention to reduce the cycle time needed for the great majority of ALU operations. It is another object of this invention to minimize the effect of carry propagation delay in the ALU without increasing the hardware complexity and without excessively adding to the number of devices needed.

The present invention, then, provides for a system whose ALU uses carry-length detection means that take advantage of the fact that most ALU operations have a largest maximum carry length, i.e. the number of consecutive input bit positions propagating a carry, that is much less than the width of the ALU. Thus, by detecting a "long" carry and providing additional time, i.e. a stretched clock cycle for synchronous systems, for the ALU to complete the operation for a small percentage of operations, a data path can be run in the present system at a faster rate for most ALU cycles.

This invention further provides for means for performing a selected operation on input operands in a predetermined clock cycle, first means for detecting a path for a carry propagation through a number of consecutive bit positions greater than a first predetermined number, and means for stretching the clock cycle by a first predetermined amount in response to a signal generated by the first detecting means. There may also be provided second means for detecting a path for a carry propagation through a number of consecutive bit positions greater than a second predetermined number, which is greater than the first, predetermined number and second means for stretching the clock cycle by a second predetermined amount in response to a signal generated by the second detecting means. Preferably, the detecting means only detects the carry propagation path for a subset of all bit positions, for excluding preselected bit positions from generating the cycle stretching signal.

This invention also provides means for performing a selected operation on input operands in a predetermined clock cycle, said operands occupying a number of bit positions, means, including a plurality of detection cells, for detecting a carry propagation path through a number of consecutive bit positions at least as great as a predetermined threshold range, the range having as a lower limit the minimum number of consecutive carry propagations within one of a plurality of predetermined groups of detection cells and as an upper limit the number of consecutive carry propagations that set at least one of the groups, and means for controlling the cycle in response to the detecting means.

DESCRIPTION OF THE PREFERRED EMBODIMENT

Figure 1A:
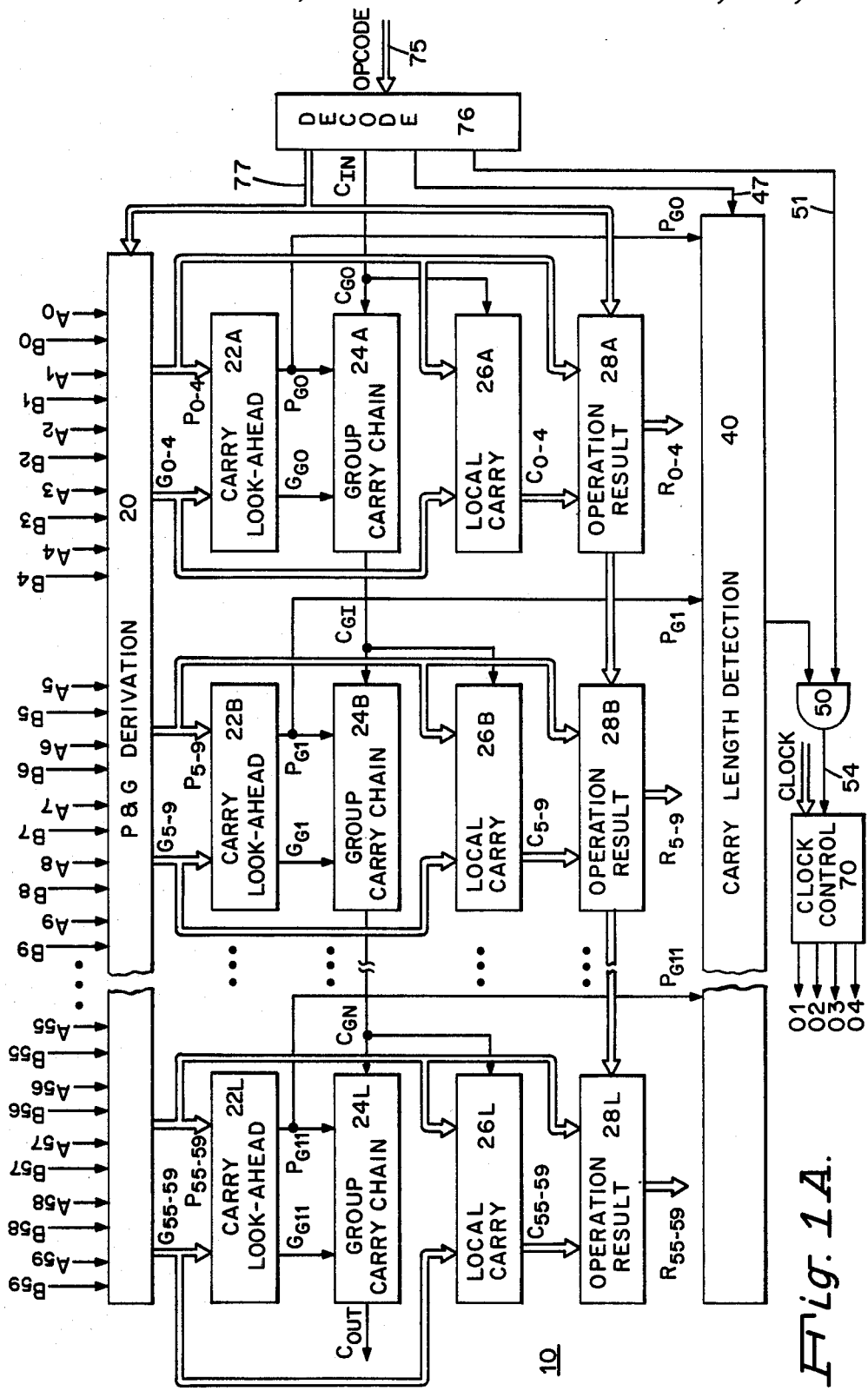
FIG. 1A shows a block diagram of an ALU using the means for detecting the carry length according to the present invention.

Referring now to FIG. 1A, there is shown a block diagram of the ALU 10 of the present invention. ALU 10 is shown as having two 60-Bit operands as inputs, namely signals $A_0$–$A_{59}$ and $B_0$–$B_{59}$ respectively. The inputs are fed to a conventional P and G Derivation Circuit 20 which is used to generate a carry-propagate ($P_i$) signal and carry-generate ($G_i$) signal for each input bit signal pair, $A_i$ and $B_j$. The $P_i$ and $G_i$ signals are generated to implement the specific function required. For instance, to implement the sum of the $A_i$ and $B_i$ inputs, the $P_i$ signal is generated as the output of an exclusive-OR gate whose inputs are the $A_i$ and $B_i$ signals, and the $G_i$ signal is generated as the output of an AND gate whose inputs are also the $A_i$ and $B_i$ signals. The $P_i$ and $G_i$ signals are then fed, in groups corresponding to 5 input bits and referred to as slices, to corresponding slices of Carry Look-Ahead Circuits 22. Each carry look-ahead circuit 22 uses the $P_i$ and $G_i$ signals of a slice to provide a group carry-propagate signal $P_{Gi}$ and a group carry-generate signal $G_{Gi}$ for that slice. For the first slice 22A, Look-Ahead Circuit 22 implements the following Boolean expressions:

$$P_{G0} = P_0 \cdot P_1 \cdot P_2 \cdot P_3 \cdot P_4$$

$$G_{G0} = G_4 + (P_3 \cdot G_3) + (P_3 \cdot P_2 \cdot G_2) + (P_3 \cdot P_2 \cdot P_1 \cdot G_1) + (P_3 \cdot P_2 \cdot P_1 \cdot P_0 \cdot G_0)$$

where "·" corresponds to the AND function and "+" corresponds to the OR function.

The remaining slices 22B, through 22L, implement similar expressions with their corresponding input signals $P_i$ and $G_i$.

Each group carry-propagate signal $P_{Gi}$ and the group carry-generate signal $G_{Gi}$ is then coupled to a corresponding slice of the Group Carry Chain Circuits 24. Each Group Carry Chain slice circuit has as one input the carry-in signal $C_{Gi}$ from the previous slice, or, for the first slice, the initial carry condition signal $C_{in}$, and processes it according to the corresponding $P_{Gi}$ and $G_{Gi}$ signals. This is implemented by passing through the $C_{Gi}$ signal from the prior slice as the $C_{Gi}$ carry output signal if $P_{Gi}$ is asserted or by asserting the $C_{Gi}$ output signal if $G_{Gi}$ is asserted.

The individual $P_i$ and $G_i$ signals and the group carry-in signal $C_{Gi}$ are also coupled to corresponding slices of the Local Carry Generation Circuits 26. For example the first stage 26A implements the following Boolean expressions:

$$C_0 = C_{G0} = C_{in}$$

$$C_1 = (C_0 \cdot P_0) + G_0$$

$$C_2 = (C_0 \cdot P_0 \cdot P_1) + (G_0 \cdot P_1) + G_1$$

$$C_3 = (C_0 \cdot P_0 \cdot P_1 \cdot P_2) + G_0 \cdot P_1 \cdot P_2 + G_1 \cdot P_2 + G_2$$

$$C_4 = (C_0 \cdot P_0 \cdot P_1 \cdot P_2 \cdot P_3) + (G_0 \cdot P_1 \cdot P_2 \cdot P_3) + (G_1 P_2 \cdot P_3) + (G_2 \cdot P_3) + G_3$$

The remaining slices implement similar expressions for the corresponding input signals $C_{Gi}$, $P_i$ and $G_i$.

The carry signals $C_i$ thus generated are then coupled in corresponding slices of Operation Result Circuits 28 to generate the result signals $R_i$. For example, to implement the sum of the $A_i$ and $B_i$ inputs the $C_i$ signals and the $P_i$ signals are coupled to an exclusive-OR gate.

The $P_{Gi}$ signals generated by Carry Look-Ahead Circuits 22, slices A-L, are also fed to Carry-Length Detection Circuit 40. The purpose of Carry-Length Detection Circuit 40 is to detect whether the width of the Carry Propagation Path is greater than a threshold value. This is implemented by detecting if the number of consecutive $P_i$ signals then are asserted is greater than a predetermined value. If it is, then the ALU operation in progress will not finish within the prescribed cycle, and a clock cycle stutter signal will be generated which will delay the next operation of the system by one additional cycle. This is implemented by ANDing the single signal from Carry-Length Detection Circuit 40 with an Allow Stutter Signal 51 in AND gate 50 and providing a Clock Stutter Signal 54 to Clock Control Circuit 70, which is used by that circuit to extend the clock cycle. As shown, Clock Control Circuit 70 produces the appropriate timing for a four-phase clock.

The block diagram for the ALU 10 also shows that the operation code 75 controlling the ALU is input to Decode Circuit 76. Decode Circuit 76 then generates various signals that are needed by the ALU and whose values depend on the operation to be performed. An 8-bit function control signal 77 may be used to determine the function, or operation, to be performed on the input operands A and B. This is achieved by controlling the generation of the $P_i$ and $G_i$ signal in P & G Derivation Circuit 20 and the generation of the $R_i$ signals in Operation Result Circuits 28. For instance, it was shown that for an addition, the function control causes the $P_i$ to be the exclusive-OR function of the $A_i$ and $B_i$ signals, and the $G_i$ to be the AND function of the $A_i$ and $B_i$ signals, while the $R_i$ is the exclusive-OR function of the $C_i$ and $P_i$ signals. An initial carry-in signals $C_{in}$ is coupled to the first slice 24A of the Group Carry Chain Circuit to be used as $C_{G0}$. An Enable Double Precision Signal on line 47 is coupled to the Carry-Length Detection Circuit 40 to be used by that circuit, as explained in more detail below, to ignore the unused bit signals during a single precision operation. Similarly, the Allow Stutter Signal on line 51 is coupled to gate 50 to inhibit the stutter signal from propagating during those operations in which the carry propagation can be ignored, for example when transferring the contents of a register to itself through the ALU. Decode Circuit 76 may be implemented by a PLA or a ROM.

Figure 1B:
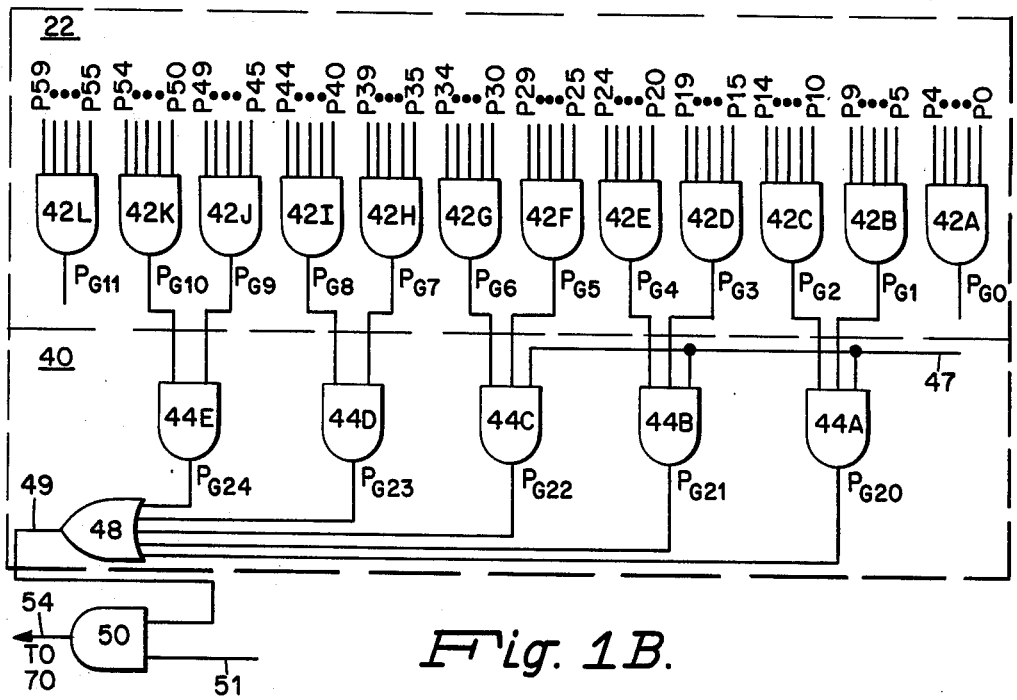
FIG. 1B shows a first preferred embodiment of the Carry Length Detection Circuit of FIG. 1A having group carry-propagate signals as inputs.

Referring now to FIG. 1B, there is shown in more detail the Carry-Length Detection Circuit 40. The carry-propagate signals $P_0$–$P_{59}$, generated by the P and G Derivation Circuit 20, are fed to a first of AND gates 42 in groups of five to generate intermediate group propagate signals $P_{G0}$ through $P_{G11}$. Thus, the $P_0$–$P_4$ signals are coupled to a first gate 42A, $P_5$–$P_9$ are coupled to a second gate 42B, and so on, with $P_{55}$–$P_{59}$ being coupled to gate 42L, the last of the first level gates. Typically these gates are part of Carry Look-Ahead Circuits 22. The outputs of this first level gating, particularly the intermediate group propagate signals $P_{G1}$ through $P_{G10}$, are fed in pairs to a corresponding gate in a second level of AND gates 44. The outputs of first and last gate 42A and 42L are not used by circuit 40 for reasons that will become clear as the description progresses. The 5-bit group carry propagate signals $P_{G1}$ and $P_{G2}$, produced respectively by gates 42B and 42C in Carry Look-Ahead Circuits 22B and 22C, are shown coupled to gate 44A, the outputs $P_{G3}$ and $P_{G4}$ of gates 42D and 42E are shown coupled to gate 44B, and so on.

The reason for the particular two levels of AND gating is that the first level of gating, i.e. gates 42A through 42L and $P_{G0}$ through $P_{G11}$, is already present in the 5-bit group carry look-ahead logic. Thus, gates 42 need not also be provided within Carry-Length Detection Circuit 40, but instead the $P_{G0}$ through $P_{G11}$ signals may be provided directly from the corresponding slices of Carry Look-Ahead Circuit 22, as shown. The ANDing in pairs of two adjacent group carry-propagate signals $P_{Gi}$ generates a signal which indicates whether or not all of the signals $P_i$ in the corresponding group of ten bits are asserted.

The output signals $P_{G20}$ through $P_{G24}$ of the second level gates 44A through 44E are then ORed in gate 48 to generate the Propagate Stutter Signal 49. Thus, a propagate stutter signal is generated if the two 5-bit carry propagate signal groups associated with any one of gates 44 are asserted.

The Propagate Stutter Signal 49 may then be asserted for as few as ten asserted consecutive signals $P_i$, provided that they fall within a coupled pair of first level gates 42. For example, if the $P_{35}$ through $P_{44}$ signals are asserted across gates 42H and 42I, then both signals $P_{G7}$ and $P_{G8}$ become asserted and, in turn, signal $P_{G23}$ from gate 44D becomes asserted. If the ten consecutive signals $P_i$ do not fall within a coupled gate pair, then none of group carry propagate signals $P_{Gi}$ might be asserted. For example if the $P_{36}$ through $P_{45}$ signals are asserted, then signal $P_{G7}$ from gate 42H is not asserted, and in turn signal $P_{G23}$ from AND gates 44D will not be asserted. The minimum number of consecutive carry-propagate signals $P_i$ that will always generate a propagate stutter signal 49 in nineteen, since that number of $P_i$ signals will always straddle a coupled gate pair. For instance if $P_{35}$ through $P_{53}$ are asserted, then all inputs to gates 42H and 42I are asserted, allowing the assertion signal to flow through and set the propagate stutter signal 49. The reason for not including the first and last gate, 42A and 42L respectively, in the second level gating should then be clear. The circuit 40 is designed to assert the propagate stutter signal 49 for as few as ten consecutive $P_i$ signals but might not set for as many as eighteen consecutive $P_i$ signals for the worst case. Thus, it is not necessary to monitor the first or last five $P_i$ signals.

The additional advantage of not gating the two end gates is that an additional performance improvement is obtained when the end bits, either least significant or most significant 5 bits, of the two inputs $A_i$ and $B_i$ are not random with respect to each other. In this case by not gating these end bits the probability of generating a clock cycle stutter is decreased.

The Propagate Stutter Signal 49 is gated in AND gate 50 with an Allow Stutter signal 51, which is normally asserted. The Allow Stutter signal 51 is not asserted for ALU operations in which all input bits produce a carry-generate signal $G_i$, thereby preventing unnecessary stutter cycles for ALU operations in which the propagation of the carry is not a factor.

A Double Precision Enable signal 47 is also included in the second level detection gates for signals $P_5$ through $P_{34}$, to eliminate detection of a long carry over bit signals unused while calculating in single precision, while all 60 bits are enabled for double precision operation.

It should be clear that the principles of this invention are not limited to 60-bit ALUs, but that they can be applied to ALUs of any width and are applicable to designs using standard parts as well as custom designed parts. The optimal width of the AND function used to produce the group carry propagate signals depends on the technology in which the ALU is implemented.

Figure 2:
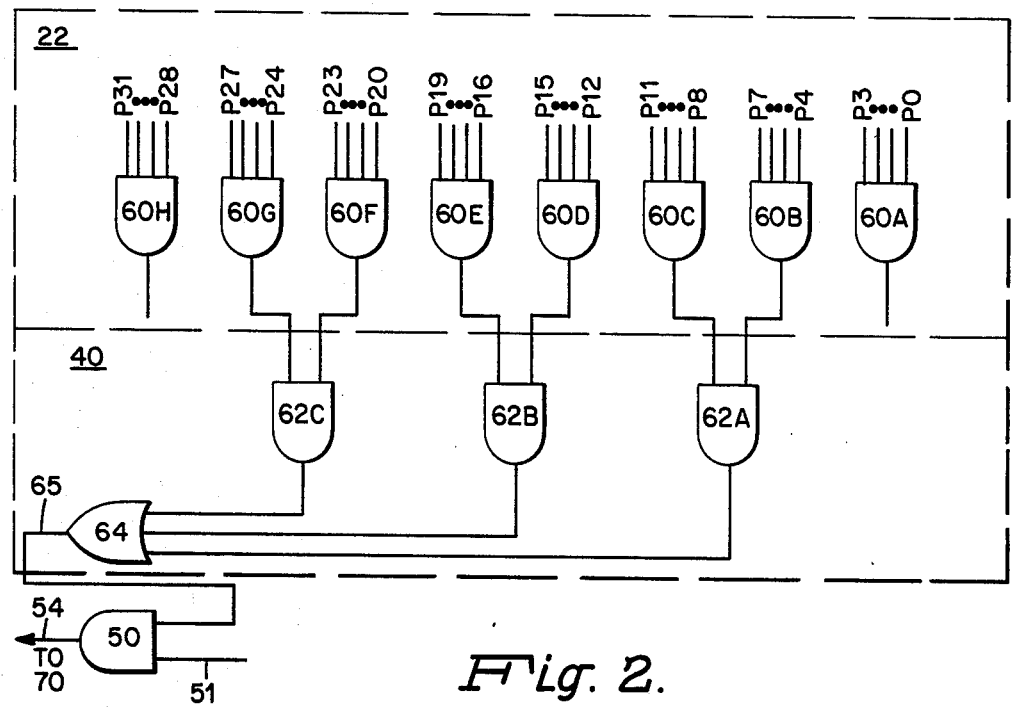
FIG. 2 shows a second embodiment of the Carry Length Detection Circuit for an ALU using 4-bit groupings, instead of the 5-bit groupings as shown in FIG. 1B.

Referring now to FIG. 2, there is shown a diagram for the Carry-Length Detection Circuit 40 for a 32-bit ALU where the width of the group carry-propagate is selected to be 4 bits. AND gates 60A through 60H form the first gating level in Carry Look-ahead circuit 22 and gates 62A through 62C form the second gating level of Carry-Length Detection circuit 40. OR gate 64 is used to propagate a Propagate Stutter Signal on a line 65 if all the eight consecutive carry-propagate signals $P_i$ of a first coupled gate pair, i.e. gates 60B–60C, 60D–60E or 60F–60G, are asserted. This circuit, then, sets the stutter signal if as few as eight consecutive $P_i$ signals line up in a corresponding coupled gate pair, but might not set it for as many as fourteen consecutive $P_i$ signals if they do not line up with a corresponding coupled gate pair. Thus, in the worst case, fifteen consecutive $P_i$ signals are needed to generate a Propagate Stutter signal 65.

In this implementation (FIG. 2) the Allow Stutter signal 51 is used as described above to inhibit the clock stutter signal for those ALU operation in which the carry propagation is not a factor.

In general, if the individual carry-propagate signals $P_i$ are not available, as they are not when using standard part ALU slices such as ALU slices 74181 and 74381 available from Texas Instruments or Microprocessor Slice AMD 2901 available from Advanced Micro Devices, then the ANDing of the $P_i$ signals can be used as shown. Since the group carry-propagate signals are already provided by any ALU with look-ahead carry, the Group Carry-Propagate signals $P_{Gi}$ can be used directly from the Look-Ahead circuitry, thus, the Carry Length Detection Circuit is very inexpensive to implement.

The mode of operation described thus far is synchronous in that the timing of all the operations is controlled by a clock signal, usually having a plurality of phases, occurring at regular intervals. If the current operation cannot complete within one of these time intervals, the clock stutter signal is used to delay the execution of a new operation by one additional time interval, during which time the current operation will finish. Thus in the case of the embodiment of FIG. 1, the ALU must be designed to be fast enough to process the worst case of eighteen consecutive carry propagations within a clock cycle, while for the embodiment of FIG. 2, the ALU must process the worst case of fourteen consecutive carry propagations within a clock cycle.

Another mode of operation is possible, however. Since the carry propagate signals become asserted after a fixed combinational delay, the Clock Stutter signal 54 is asserted early enough in the cycle to extend a phase of the system clock by a predetermined amount allowing just enough time for the current operation to complete if necessary. This additional time, provided if a stutter signal is asserted, must be long enough for the worst case of consecutive carry propagations to complete. In this mode of operation the stutter signal is not used to "stutter" the system clock, to essentially issue a fixed increment of delay, but is used to delay the clock cycle by a variable amount sufficient to assure completion of the current operation.

Figure 3:
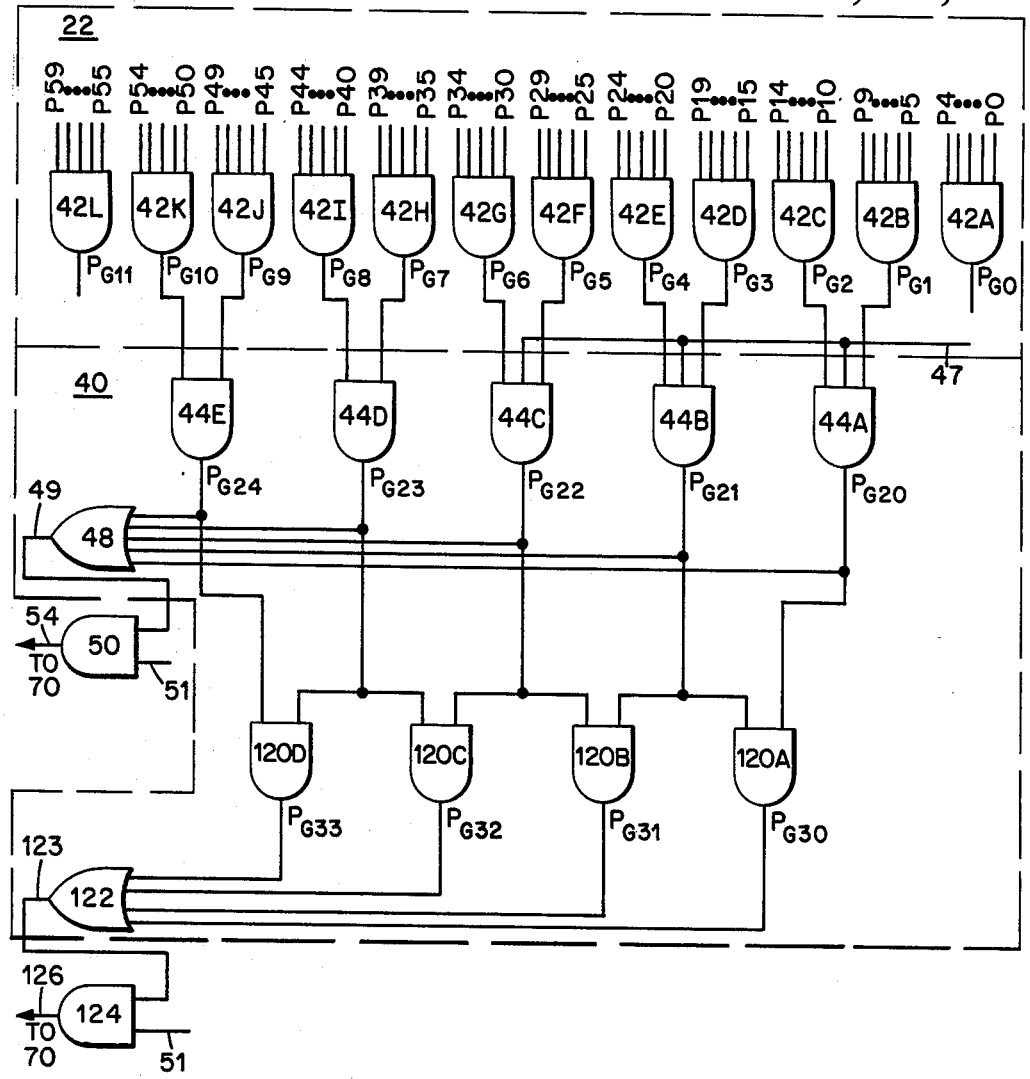
FIG. 3 shows a third embodiment of the Carry Length Detection Circuit using multi-tier gating.

Referring now to FIG. 3, there is shown an embodiment of the invention implementing this feature. The first level gates 42 of Carry Look-Ahead Circuit 22 are coupled to second level gates 44 in Carry Length Detection Circuit 40, and in turn are coupled through OR gate 48 to gate 50 to generate a first Clock Stutter signal 54, as explained before in connection with FIG. 1. Stutter signal 54 is now used by Clock Control 70 to extend a phase of the system clock, by a first predetermined amount, if the current operation can be completed within this additional time. To determine if more time is needed to complete the current operation a second tier of carry-length detection using a wider bit grouping is used, and if needed it provides a second predetermined amount of clock stretch. To implement this, the paired group carry-propagate signals $P_{G20}$ through $P_{G24}$ are now also used in consecutive pairs as inputs to a third gating level formed by AND gates 120A through 120D. The wide-group carry-propagate signals $P_{G30}$ through $P_{G33}$ are then ORed in OR gate 122 to provide a second Propagate Stutter signal 123. This is in turn gated by AND gate 124 with the Allow Stutter signal on line 51 to produce a second stutter signal on line 126. In the embodiment shown, the stutter signal on line 126, when asserted, will extend, by a second predetermined amount, a phase of the system clock if as few as twenty consecutive carry-propagate are asserted, but will always set if at least twenty-nine consecutive carry-propagate signals are asserted. Thus, clock control 70 will extend a phase of the ALU clock by a first amount of time equal to at least the propagation delay of an additional ten consecutive carry propagations if stutter signal 54 is asserted. If stutter signal 126 is asserted, Clock Control 70 will further extend the phase by a time equal to a second preselected amount to account for the worst case of consecutive carry propagation. Thus, by providing additional gating tiers, the delay of the current clock phase may be more closely tuned to the actual time required to complete the current operation. In most cases the additional time is substantially less than the full additional clock cycle as discussed in connection with the prior figures, thus further improving the performance of the ALU.

Even by using a single stutter signal, the performance is increased, because most ALU operation (greater than 95%) will not require an additional clock cycle. For example, in the circuit described in FIG. 1, the probability of requiring an additional cycle, a stutter, on random data is approximately:

$$P = ((w-m)/n)\,(2^{(w-n)})/2^w$$

Where
w = width of ALU
m = number of bits not included in a detection gate
n = width of the detection gate
This reduces to $$P = ((w-m)/n)\,(2^{-n})$$

For double precision operations:

w = 60, m = 10, n = 10 Resulting in P = 5/1024 and for single precision operations:

w = 30, m = 10, n = 10 resulting in P = 2/1024.

It should be noted that the equation used produces a slightly high probability function since data which sets more than one detection gate is counted more than once.

Figure 4:
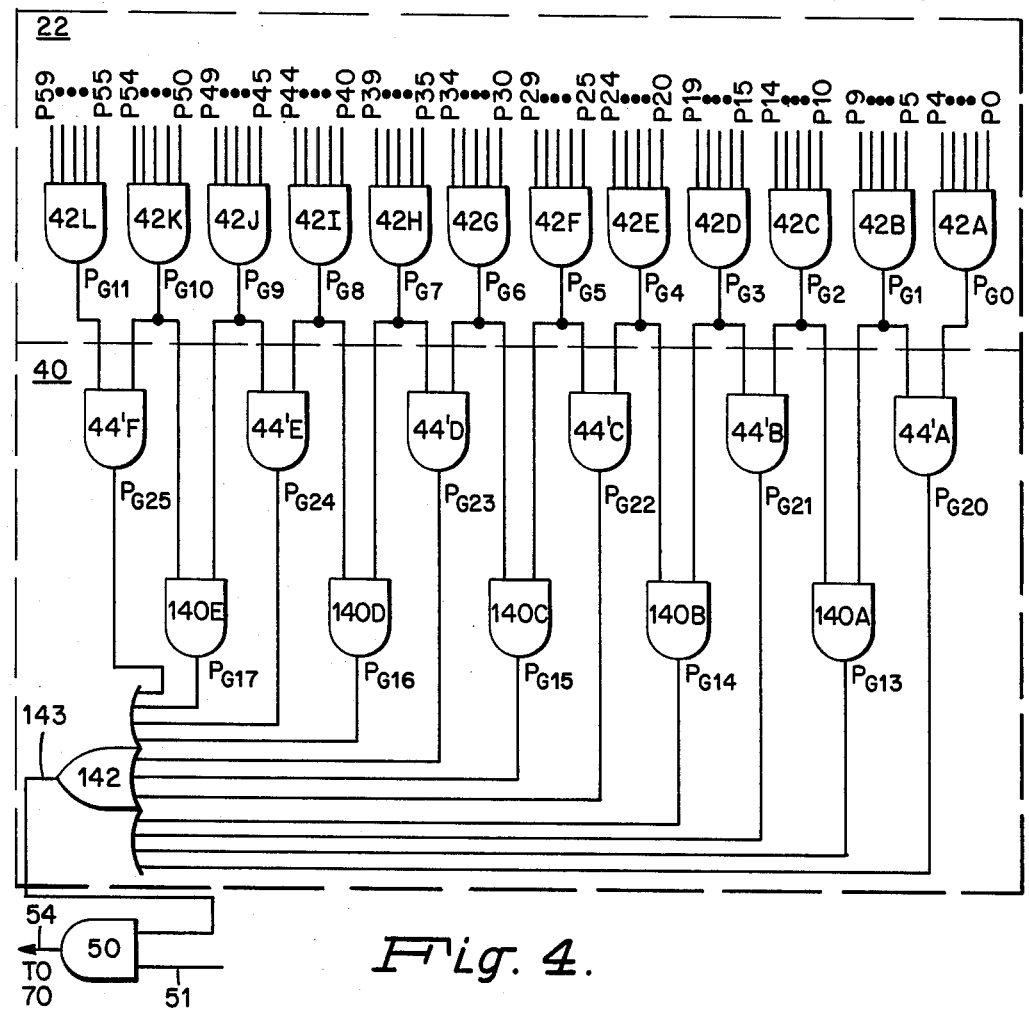
FIG. 4 shows fourth embodiment of the Carry Length Detection Circuit using additional gates for overlapping bit groupings.

The present invention provides for an ALU that must handle in a unit cycle, without a clock stutter, the maximum number of consecutive carry propagations that will not assert the stutter signal. For example, this number is eighteen for the embodiment shown in FIG. 1 and fourteen for the embodiment of FIG. 2. However, it should be understood that this number can be decreased to accommodate slower ALU designs without compromising, i.e. decreasing, the minimum number of consecutive carry propagations that will trigger a clock stutter. Thus the difference between the maximum carry length which always stutters the clock and the minimum carry length which might stutter the clock can be controlled by adding additional sets of AND gates to produce overlapped groupings of consecutive carry propagate signals. This is shown in the embodiment of FIG. 4, where the first level gates 42A through 42L are used as before to provide the initial grouping of five carry-propagate signals $P_i$ to produce group carry-propagate signals $P_{G0}$ through $P_{G11}$. The group carry-propagate signals are paired into a corresponding second level set of AND gates 44A–44F. This time the first and last first level gates 42A and 42L are shown as included in the gating to provide uniform detection across all bit positions. Additionally, gates 140A–E are used, also in the second level, to provide a second set of groupings offset by one of gates 42A–42L to overlap with the first set of groupings. All of the output signals $P_{G13}$ through $P_{G17}$ from the second level AND gates are gated in OR gate 142 to produce a Propagate Stutter signal 143. With this arrangement, the Propagate Stutter signal on line 143 might be set with a minimum of ten consecutive carry-propagate signals, provided that they line up with any two first level gates (for instance $P_{35}$ through $P_{44}$ in gates 42H and 42I). With such an arrangement, the Propagate Stutter signal will always set with fourteen consecutive carry-propagate on the input of the first level gates 42 (for instance, $P_{31}$ through $P_{44}$ in gates 42G, 42H and 42I). Thus, the ALU for the embodiment shown in FIG. 4 need only process a maximum of thirteen carry propagations within a clock cycle, without requiring a clock strutter.

A modification to the Carry-Length Detection Circuit 40 may be made, by changing the type of signals monitored to detect the continuous propagation path. For instance, instead of using only the group carry-propagate signals $P_{Gi}$, the carry generate signals $G_i$ could also be used in the first level gating to detect a break in the carry propagation path, which occurs if the $G_i$ signal is asserted.

Figure 5:
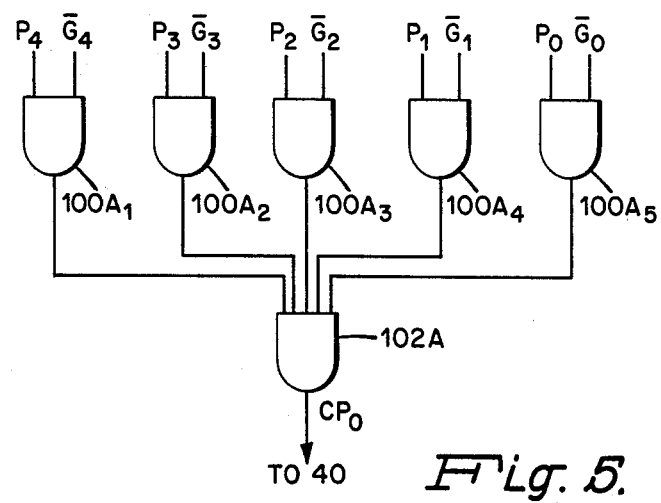
FIG. 5 shows a cell used to produce an alternate input to the Carry Length Detection Circuit of the prior figures.

In this case, an arrangement using a plurality of cells, a single such cell being shown in FIG. 5, can be used to produce the appropriate signals to be used as inputs to the Carry-Length Detection circuit 40. In each cell an output signal is produced in two stages. First the AND function of individual carry-propagate signals $P_i$ with the complement of a corresponding carry-generate signal $G_i$ is provided by gates $100A_1$ through $100A_5$. Second, an AND gate 102A is used to produce the Boolean expression:

$$CP_0 = (P_4 \cdot \overline{G_4}) \cdot (P_3 \cdot \overline{G_3}) \cdot (P_2 \cdot \overline{G_2}) \cdot (P_1 \cdot \overline{G_1}) \cdot (P_0 \cdot \overline{G_0})$$

where $CP_0$ is the first signal provided as an input to the first gate of Carry Length Detection Circuit 40. Each cell, then provides a signal which is asserted only if all its corresponding $P_i$ and none of the $G_i$ signals are set.

Other modifications to the preferred embodiment will also be apparent to those skilled in the art without departing from the spirit and scope of the present invention. Accordingly, it is intended that this invention be not limited to the embodiments disclosed herein except as defined by the appended claims.

What is claimed is:

1. A timing signal control circuit for controlling a timing signal generator that generates iterative periodic timing signals used to control an operating unit that includes means for performing operations in response to said timing signals, said operating unit including an arithmetic and logic unit that processes data signals in parallel and, in performing selected processing operations, generates carry propagate signals in parallel, each said carry propagate signal having an asserted condition and a negated condition, said timing signal control circuit comprising:

A. control signal generating means for receiving said carry propagate signal and for generating a control signal in response to a selected number of sequential ones of said parallel carry propagate signals having the asserted condition; and B. disabling means connected to said control signal generating means and for connection to said timing signal generator for disabling said timing signal generator for a selected period of time in response to said control signal, thereby to elongate the period between timing signals when said selected number of sequential ones of said parallel carry propagate signals have the asserted condition.

2. A timing signal control circuit as defined in claim 1 wherein said control signal generating means includes a plurality of coincidence gate means each for receiving a predetermined number of selected sequential ones of said parallel carry propagate signals and for generating an asserted output signal if none of the received signals are negated, and means connected to the output terminals of all of said coincidence gate means for generating said control signal in response to any of said output signals being asserted.

3. A timing signal control circuit as defined in claim 1 wherein said operating unit further generates an enabling signal, said timing signal control circuit further including coincidence gate means connected to receive said control signal from said control signal generating means and for connection to receive said enabling signal, for enabling said disabling means in response to the coincidence of said control signal and said enabling signal.

4. A timing signal control circuit as defined in claim 1 further comprising:

A. second control signal generating means for receiving said carry propagate signals and for generating a control signal in response to a second selected number, greater than said first selected number, of sequential ones of said parallel carry propagate signals having the asserted condition; and B. second disabling means connected to said second control signal generating means and for connection to said timing signal generator for disabling said timing signal generator for a second selected period of time in response to said control signal, thereby to further elongate the period between timing signals when said second selected number of sequential ones of said parallel carry propagate signals have the asserted condition.

* * * * *